(12) United States Patent
    Zhang

(10) Patent No.: US 10,698,977 B1
(45) Date of Patent: Jun. 30, 2020

(54) SYSTEM AND METHODS FOR PROCESSING FUZZY EXPRESSIONS IN SEARCH ENGINES AND FOR INFORMATION EXTRACTION

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 0 days.

(21) Appl. No.: 16/207,402

(22) Filed: Dec. 3, 2018

Related U.S. Application Data

(63) Continuation of application No. 14/961,882, filed on Dec. 7, 2015, now Pat. No. 10,146,751.

(60) Provisional application No. 62/098,978, filed on Dec. 31, 2014.

(51) Int. Cl.
    | | |
    |---|---|
    | *G06F 17/00* | (2019.01) |
    | *G06F 17/22* | (2006.01) |
    | *G06F 17/27* | (2006.01) |
    | *G06F 17/21* | (2006.01) |
    | *G06F 16/31* | (2019.01) |

(52) U.S. Cl.
    CPC ........ *G06F 17/2247* (2013.01); *G06F 16/313* (2019.01); *G06F 17/218* (2013.01); *G06F 17/277* (2013.01)

(58) Field of Classification Search
    CPC .... G06F 17/2785; G06F 17/28; G06F 17/277; G06F 17/2735; G06F 17/279; G06F 17/2775; G06F 17/278; G06F 17/2755; G06F 17/30654; G06F 17/30734; G06F 17/2705; G06F 17/21; G06F 17/30864; G06F 17/30604; G06F 17/30684; G06F 17/30976; G06F 17/272; G06F 17/30253; G06F 17/30401; G06F 17/218; G06F 17/227; G06F 17/27; G06F 17/30011; G06F 17/30663; G06F 17/30731; G06F 17/2247; G06F 17/2282; G06F 17/2881; G06F 17/30424; G06F 17/30666; G06F 19/24

See application file for complete search history.

(56) References Cited

U.S. PATENT DOCUMENTS

| | | | |
|---|---|---|---|
| 5,128,865 | A | 7/1992 | Sadler |
| 5,151,857 | A | 9/1992 | Matsui |
| 5,930,788 | A | 7/1999 | Wical |
| 6,081,774 | A | 6/2000 | de Hita et al. |
| 6,101,515 | A | 8/2000 | Wical |
| 6,473,753 | B1 | 10/2002 | Katariya |
| 6,487,545 | B1 | 11/2002 | Wical |
| 6,847,966 | B1 | 1/2005 | Sommer et al. |

(Continued)

*Primary Examiner* — Edgar X Guerra-Erazo

(57) ABSTRACT

System and methods for enhancing search engine functionality by enabling and providing a new search function based on fuzzy expressions in a query string. When a query is received by a search engine, it is first analyzed to identify whether the query contains an expression that represents a fuzzy reference to certain objects or properties of objects, or object with certain properties, to overcome the limitations of the keyword-matching methods used by conventional search engines. For example, the present invention can accurately retrieve results for a query such as "find large-screen smartphones" or "find light-weighted computers", by understanding the meaning of the query and automatically identifying objects with applicable properties and mapping the meaning of the expression to such objects.

20 Claims, 16 Drawing Sheets

(56) References Cited

U.S. PATENT DOCUMENTS

| | | | |
|---|---|---|---|
| 6,910,003 B1 | 6/2005 | Arnold et al. | |
| 6,986,104 B2 | 1/2006 | Green et al. | |
| 7,263,517 B2 | 8/2007 | Sheu et al. | |
| 7,409,336 B2 | 8/2008 | Pak et al. | |
| 7,657,425 B2 * | 2/2010 | Ejerhed | G06F 17/27 704/9 |
| 8,370,129 B2 | 2/2013 | Zhang | |
| 8,407,217 B1 | 3/2013 | Zhang | |
| 8,498,983 B1 | 7/2013 | Zhang | |
| 8,612,208 B2 * | 12/2013 | Cooper | G06F 17/2735 704/9 |
| 8,819,001 B1 | 8/2014 | Zhang | |
| 8,843,476 B1 | 9/2014 | Zhang | |
| 8,909,648 B2 | 12/2014 | El-Yaniv | |
| 10,146,751 B1 * | 12/2018 | Zhang | G06F 16/313 |
| 2002/0103837 A1 | 8/2002 | Balchandran et al. | |
| 2004/0107088 A1 | 6/2004 | Budzinski | |
| 2004/0133560 A1 | 7/2004 | Simske | |
| 2006/0053156 A1 | 3/2006 | Kaushansky et al. | |
| 2007/0255553 A1 | 11/2007 | Nomoto | |
| 2009/0204605 A1 | 8/2009 | Bai et al. | |
| 2014/0114649 A1 | 4/2014 | Zuev et al. | |

* cited by examiner

Object or concept name:

510

|  | Computer | USB Drive | Keyboard |
|---|---|---|---|
| computer | 1 | 1 | 1 |
| CPU | 1 | 0 | 0 |
| memory | 1 | 0 | 0 |
| hard disk | 1 | 1 | 0 |
| operating system | 1 | 1 | 1 |
| software | 1 | 1 | 0 |
| …… | …… |  |  |

|  | Computer | Intel | Microsoft |
|---|---|---|---|
| computer | 1.0 | 0.86 | 0.9 |
| CPU | 0.99 | 0.95 | 0.5 |
| memory | 0.95 | 0.5 | 0.4 |
| hard disk | 0.8 | 0.1 | 0.52 |
| operating system | 0.98 | 0.12 | 0.9 |
| software | 0.7 | 0.2 | 0.98 |
| …… | …… |  |  |

Figure 5B

|  | Problem Reported | Issue Type | Question Asked | Question Type |
|---|---|---|---|---|
| Product A | "An error msg occurred" | seeing error messages | "How to correct the problem?" | Operating steps |
| Product B | "The screen disappeared." | Failed to work | "Where I can check the config file?" | Info for config |
| Product C | …… | …… | …… | …… |
| …… | …… | …… | …… | …… |

```
<problem reported>
    <problem description> seeing error messages </problem description>
        <issue types>
            <type name>Error msg</type name>
        </issue types>

<problem description> The screen disappeared</problem description>
        <issue types>
            <type name>Failed to work</type name>
        </issue types>

......
    ......
</problem reported>
```

```
<question asked>
    <question text> Need to know how to generate a report</ question text >
        <question types>
            <type name>Operating Procedure</type name>
        </question types>

<question text> Does it come with a control unit?</ question text >
        <question types>
            <type name>Feature Availability</type name>
        </question types>

......
    ......
</question asked >
```

> User 1 wrote on 1/5/2012:
> I went to this restaurant last week. Their food was good, but their service is terrible. The wait was very long, and the staff was not responsive at all. .....
>
> User 2 wrote on 12/10/2011:
> We like this restaurant very much. Most of their food was delicious, the only problem we had was that their parking space was crowded. .....
>
> User X wrote on ...
> ......

> Customer 1 wrote:
>
> We installed product A, after that we kept on seeing error messages. I'd like to know what steps we should take to avoid such errors. .....
>
> Customer 2 wrote:
>
> We have product Y. We are unable to control the output from the second unit. Does it come with a control function?
>
> User X wrote ...
> ......

Figure 14B

SYSTEM AND METHODS FOR PROCESSING FUZZY EXPRESSIONS IN SEARCH ENGINES AND FOR INFORMATION EXTRACTION

CROSS REFERENCES TO RELATED APPLICATIONS

The present application is a continuation application of U.S. patent application Ser. No. 14/961,882, filed on Dec. 7, 2015, now U.S. Pat. No. 10,146,751. U.S. patent application Ser. No. 14/961,882 claims priority to U.S. Provisional Patent Application 62/098,978 entitled "System and Methods for Creating Structured Representations for Unstructured Data" filed on Dec. 31, 2014, the disclosures of both applications are incorporated herein by reference.

The present application also incorporates the disclosures from U.S. patent application Ser. No. 14/214,955 entitled "System, Methods, and User Interface for Searching Objects and Providing Answers to Queries Using Association Data", filed on Mar. 16, 2014, and U.S. patent application Ser. No. 13/742,337 entitled "System, Methods, and Data Structure for Quantitative Assessment of Symbolic Associations", filed on Jan. 15, 2013, the disclosures of which are incorporated herein by reference.

BACKGROUND OF THE INVENTION

The functionality of conventional search engines is mostly limited to matching keywords in the query with keywords in a content being searched. Conventional search engines cannot effectively handle natural language-based queries, especially when such queries contain fuzzy expressions.

For example, if a user is conducting a product search and the user enters a query string such as "find computers that are not too heavy", or "large-screen smart phones", etc., conventional search engines cannot understand the expressions that convey certain types of fuzzy meaning, such as "not too heavy", or "large", etc. More advanced technologies to build a more intelligent search engine is much needed.

Furthermore, a different type of problem in the field of textual data processing, or in the technical field of natural language processing in general, is that, in comparison to what is known as structured data, such as the data stored in various types of databases in various organizations, the majority of the data so far accumulated in this information and Big Data age are still in a format known as unstructured data, the type of data that are mainly in a free text format, such as documents, emails, text messages, social media user-generated data such as product or service reviews, comments, customer feedback, etc.

Extracting useful information, especially gaining insights from a large amount of unstructured data for better decision-making, and better customer satisfaction has long been a challenge to many companies or organizations. The currently available data analysis tools, including what is known as the structured query language and related statistical analysis tools, usually do not perform well with unstructured data due to such data being "unstructured". One example of an unstructured data problem is that a company or organization of a certain size usually has a huge amount of unstructured data created either by its employees or by its customers. How to effectively handle such data to improve the overall business has been a difficult task to accomplish for many companies, or even governments.

However, while being considered "unstructured", text data of various types do have their internal structures, such as linguistic structures, as well as pragmatic structures, and more importantly, informational structures. The challenge is that such structures are usually difficult to discern and analyze by automated means due to the limitations of the current technological stage and the complexity of human language.

More advanced technologies in handling the unstructured data by identifying relevant or critical information hidden in a large amount of unstructured data is much needed.

SUMMARY OF THE INVENTION

The present invention provides system and methods for enhancing search engine functionality by enabling and providing a new search function based on fuzzy expressions in a query string. When a query is received by a search engine, it is first analyzed to identify whether the query contains an expression that represents a fuzzy reference to certain objects or properties of objects, or object with certain properties, to overcome the limitations of the keyword-matching methods used by conventional search engines. For example, the present invention can accurately retrieve results for a query such as "find large-screen smart-phones", by understanding the meaning of the query and automatically identifying objects with applicable properties and mapping the meaning of the expression to smart-phones that have large screens as compared to smart phone that have relatively smaller screens, without requiring the user to specifically enter the size of the screen.

The present invention further provides system and methods for identifying and extracting relevant and mission-critical information from a large amount of unstructured data, and organizing such information in a structured or semi-structured format, such that analysis tools that are currently available for analyzing structured data can be applied to the transformed unstructured data, including common types of analysis methods such as issue analysis, trend analysis, pattern analysis, etc., and more insights can be gained from such data and analysis for improved decision-making.

In some embodiments, the present invention provides methods for analyzing the linguistic and informational structure of various unstructured data, in an object-properties association framework, and producing datasets that can be used as structured or semi-structured representations of a large amount of unstructured data, without any pre-defined data field or a target type of information. Examples with social media user comments on various products or services are described.

In some embodiments, the present invention provides methods for identifying desired key information of various types hidden in the unstructured data, depending on the specific interest or relevance or need. Then the methods extract the specific text content representing such information types, and create a data structure to store such information. Examples with enterprise technical support and customer feedback data are described.

In addition to identifying the above types of hidden information and structure that are usually unknown before any analysis is performed, in some embodiments, the present invention provides contextual methods for identifying certain pre-defined types of information in the unstructured data source, and extracting specific text content containing or representing such information, and storing such content in pre-defined data fields in a structured database. Examples with identifying and extracting specific types of information from call-center data, product discussion data, and resume and job description documents are described.

The system and the methods described in the present disclosure can be generally applied to the unstructured data problems in various domains or industries.

BRIEF DESCRIPTION OF THE DRAWINGS

FIGS. 5A and 5B illustrate the structure of a term-concept or term-topic matrix.

FIG. 10 is an example of a structured representation in the form of a data table for the information extracted from unstructured data sources.

FIG. 11 is an illustration of representing the category information of the extracted problem text in an XML format.

FIG. 12 is an illustration of representing the category information of extracted question text in an XML format.

FIGS. 14A and 14B are examples of different types of unstructured data that can be transformed into structured formats illustrated in FIGS. 3, 4, 5, 6, 7, and 10, 11, 12.

DETAILED DESCRIPTION

In U.S. Pat. No. 8,370,129, entitled "System and Methods for Quantitative Assessment of Information in Natural Language Contents", methods are disclosed for quantitatively assessing information contained in natural language contents. The methods are based on a theoretical framework called Object-Properties Association Model of Language and Information (OPAM), developed by the present inventor.

The model states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM contends that an object can be uniquely defined by all its associated properties each of which carries a varying amount of information about the object.

Figure 1:
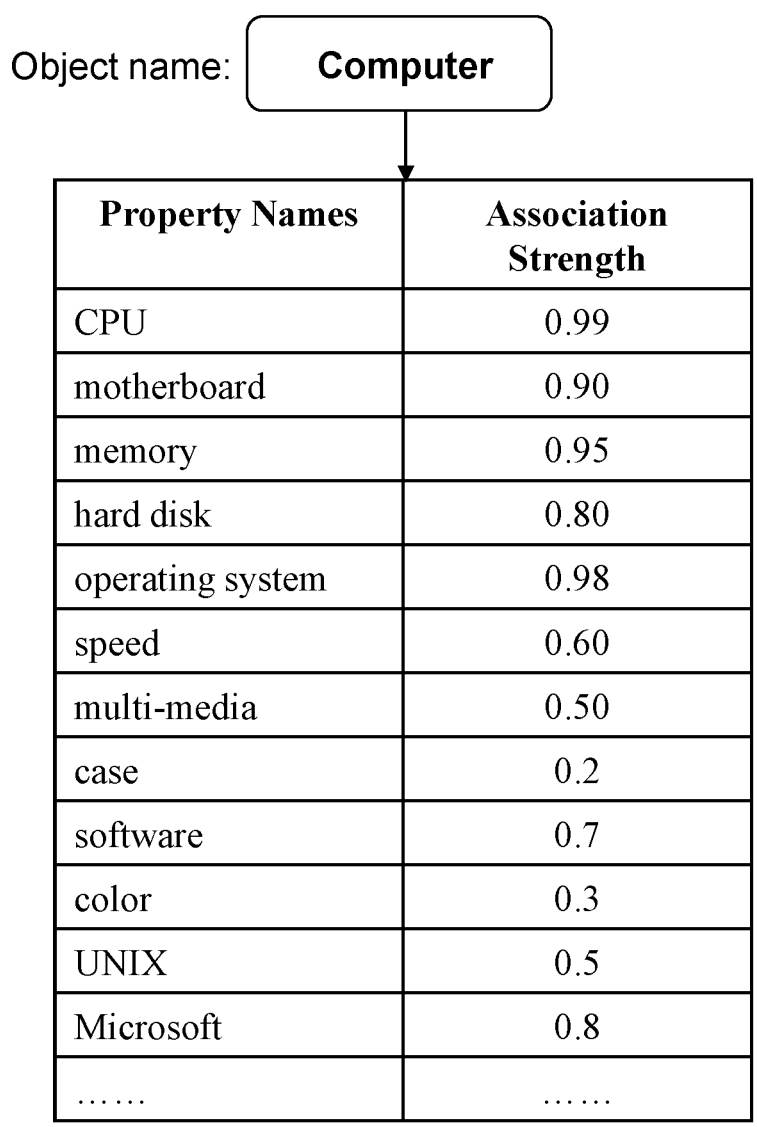
FIG. 1 illustrates an example of an object, its properties and their association strengths associated with the object.

As an example, an object named "computer" is defined by the Merriam-Webster online dictionary as "one that computes; specifically: a programmable usually electronic device that can store, retrieve, and process data". However, the OPAM model of the present disclosure has a different approach to represent our knowledge about the object of "computer". Referring to FIG. 1, in the OPAM model, the object named "computer" is characterized by a plurality of associated properties such as "CPU", "motherboard", "memory", "hard disk", "operating system", "speed", "case", "software", etc., that are associated with the object "computer". The prominence of the association between "computer" and each of the properties is characterized by a numerical value herein called association strength.

Hypothetical values for the association strengths for "CPU", "motherboard", "memory", "hard disk", "operating system", can for example respectively be 0.99, 0.90, 0.95, 0.80, and 0.98. A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. OPAM model of the present invention, in contrast, focuses on what properties are associated with a particular object and their association strength or defining power to the object. OPAM is not focused on the exact types of relationships between the properties and the object.

In OPAM, the object can be a physical object, an abstract object, and can be represented by a symbolic name in a language such as a word, a list of words or a phrase, a character string, a query, a sub-component of a query, a topic, or the name of a document category or document class. In a more general sense, the term "object" can stand for an object class, including the concept of certain things, such as "computer" or "computers". When this is the case, the object class can have sub-classes, such as "desktop computers", and "notebook computers", or "Dell computers", etc. and each sub-class can have instances, such as a specific desktop computer. In the following description, the term "object" can refer to a class, a sub-class, or a specific instance of the object.

It should be noted that as the present disclosure involves natural languages, and makes references to certain grammatical terms such as a "sentence", and the "subject" and "predicate" of a sentence, and an "object" of a verb, and parts of speech. The term "object" used in the present disclosure in the context of the Object Properties Association Model (OPAM) is different from the grammatical term of "object" that refers to the object of a transitive verb, such as a noun or a pronoun, which may be in the accusative case in certain languages, as is used when describing new methods using grammatical analysis with parts of speech, in which case the term "grammatical object" or "verb object"

may be used. In the context of the Object Properties Association Model (OPAM), the sense of "object" used is a thing or a concept with a name.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a keyboard, as shown in FIG. 1. The property "CPU" having an association-strength of "0.99" is a more defining feature to the object "computer" than the property "case" that has an association-strength value of "0.2".

For ease of illustration, the terms of "defining power", "prominence", "importance", "association strength", etc., may be used interchangeably; and the terms "property" and "attribute", or "property value" and "attribute value", can also be used interchangeably, whenever appropriate.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A "John is a student."
1B "John is intelligent."

"John" is the subject of the sentences, while "is a student" and "is intelligent" are respectively the predicates of 1A and 1B.

In the OPAM by the present inventor, the predicate is interpreted as providing a piece of measurable information about the subject of the sentence. The OPAM model also states that human languages convey information in the basic form of stating that an object has certain properties, or an object is associated with certain other objects as being its properties or property values. The general information structure for a simple declarative sentence is "Object O has or is associated with Property P", or O+P, corresponding to the grammatical structure of "Subject+Predicate".

In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In OPAM of the present invention, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure.

In conventional grammar, a compound sentence is a sentence that contains two or more independent clauses, or non-embedded clauses, such as "John is a student, and Mary is a teacher." in which the two clauses do not contain each other. In the present disclosure, the term "complex sentence" refers to both the complex sentence and the compound sentence.

A document can include one or more paragraphs. Each paragraph can include one or more simple and/or complex sentences. The subject or the predicate of a sentence can be in the form of a single word, a string of words or a phrase, or an embedded clause.

A phrase in a language can be a simple phrase, such as a single word, or a complex phrase of multiple words. In linguistics, a complex phrase is usually a phrase consisting of a head and one or more modifiers of the head. For example, in the complex phrase of "digital cameras", the word "camera" is the head, and "digital" is a modifier. In the OPAM model of the present disclosure, the head is treated as the name of an object (or a class of similar objects), and a modifier is treated as the name of a property of the object or class. The complex phrase of "digital cameras" is the name of a subclass of cameras that all have the property of being digital in nature, and has the information structure of "an object (class) O that has the property of P". A head can be a multiword phrase, such as "New York", and a modifier can also be a multiword phrase, such as "North West" in a complex phrase of "North West New York". The information structure of O+P can also be recursively applied to a complex phrase and its sub-phrases.

More details about other aspects of the Object-Properties Association Model are disclosed in the referenced disclosure, and are incorporated herein by reference.

In U.S. patent application Ser. No. 14/214,955 entitled "System, Methods, and User Interface for Searching Objects and Providing Answers to Queries Using Association Data", filed by the present inventor on Mar. 16, 2014, and U.S. Provisional Patent Application 61/931,595 filed by the present inventor on Jan. 25, 2014, system and methods are provided based on the principles of the OPAM model to extract object-properties association information from unstructured text contents, and to create association datasets and use such data to answer both conventional or natural language search queries. Moreover, the datasets created by the methods can be further used to build a structured or semi-structured representation of the information in unstructured data sources. The disclosures of these applications are herein incorporated by reference.

Creating Object-Properties Association Datasets from Unstructured Data

In some embodiments, for a given collection of unstructured text data as a data source, one method for creating an object-properties association dataset is to first identify a sentence in the data source, and treat the grammatical subject as an object name, and select a part or the whole of the predicate of the sentence as a name or description of the object. As described in the above-mentioned patent applications which are incorporated herein by reference, in some embodiments, association strength values are also determined based on the context of the property term in the sentence, including the syntactic or semantic attributes, structure, and relationships associated with the property term, or its frequency in the data source.

This method can dynamically create various object or conceptual datasets for a given unstructured text content or a collection of such text contents, and then be used for answering questions based on the information extracted from such contents. The datasets so created can also be used as a structured or semi-structured representation of the content in the unstructured data set.

For example, suppose the unstructured data is a collection of user reviews on a restaurant. Some reviews may contain sentences such as "The food is excellent." Others may say "The food is delicious.", "The service is poor", or "Parking is crowded".

Using the methods of the present invention, terms associated with the grammatical attribute of being a subject of a sentence can be identified, such as "food", "service", and "parking"; and terms associated with the grammatical attribute of being a predicate of a sentence can also be identified, such as "excellent", "delicious", "poor", and "crowded". Based on these, object datasets can be created based on the subject terms, with each term as an object, and with the terms in the corresponding predicate as property terms associated with their respective objects.

Once the datasets are created, a user can ask a question such as "How is the food?", or "What is the food like in this restaurant?", or simply "food", in which the term "food" can be identified as an object name with a matching object dataset in the system, and the search engine can retrieve the properties associated with the object "food", such as "excellent", and "delicious", and display such property terms in the user interface as an answer to the question. If there are more reviews that mention the food as being "delicious", then in one embodiment where the frequency of the term is taken into account, the association strength of the property term "delicious" will have a larger value than that of "excellent", and thus will be ranked higher than the property of "excellent" when displayed as an answer, as described above. If the word "delicious" is part of a complex phrase, such as "not delicious", or "no delicious food", etc., then in another embodiment where the phrase structure and the role of the term in the phrase is taken into account, the association strength of the property term "delicious" with the object of food can have a smaller value, and be ranked lower.

On the other hand, a user can also ask a question such as "What is poor about this restaurant?" and the term "poor" can be identified as a property name based on its grammatical attribute of being a predicate of the sentence, and the object name associated with this property can be retrieved and displayed to the user as an answer to the question, which in this particular example, is "service". And if the user's question is "What is excellent about this restaurant?" then the object name of "food" can be retrieved and displayed as an answer.

One advantage of the present invention over the conventional keyword-based search is that it does not need to return a list of many reviews as different documents that contain the keyword and then require the user to read these documents. In contrast, it can directly return a simple and relevant answer, saving the user much effort in reading through a long list of documents.

Another advantage of the present invention is that it also allows the user to ask a natural language question as a search query.

As described above, the object-properties relationships can also be represented by a complex phrase comprising a head term and one or more modifier terms, or two or more sub-components in such a multi-word phrase. For example, phrases such as "Chinese food", "Japanese food", Mexican food", etc., are complex phrases comprising the head term "food", and "Chinese", "Japanese", and "Mexican" as modifiers. When each phrase is a subject term, the whole phrase can be an object name, such as the whole phrase of "Chinese food". On the other hand, the head term "food" can also be another object name for the purpose of creating a dataset, or adding to an existing dataset, with modifiers as its properties. In the above case, a dataset named "food" can be created, with terms such as "Chinese", "Japanese", and "Mexican" as its properties. An exemplar representation of such a dataset can be {food: ["Chinese", "Japanese", "Mexican"]}. It can serve queries such as "What food do they serve?", etc., by displaying the property terms such as "Chinese", "Japanese", "Mexican", as an answer or part of an answer.

When the object dataset is based on the head-modifier relationships in a phrase, the phrase itself does not need to be a subject of a sentence as in the canonical form of object-properties relationships described above. The phrase can also be a part of the sentence that is not a subject, such as a verb object, or the noun phrase in a prepositional phrase, etc. In some embodiments, a simple phrase can be treated as a special case of a complex phrase consisting of only a head without a modifier. In such cases, the object dataset can be based on simple noun or noun phrase, which can include a noun or noun phrase in any position in the sentence, with the other terms in the sentence as its property terms. For example, if a text content contains two sentences such as "John wrote a book in English", and "Mary wrote a book in French", a non-subject term, such as the term "book", can be treated as the name of an object, and other terms in the sentences can be treated as properties associated with the object of "book", and a dataset can be created to represent the relationships, such as in a dataset like {"book": ["John", "Mary", "in English", "in French", . . . ]}. If the query is "In what languages are the books?", property terms such as "in English" and "in French" can be retrieved from the dataset as answers.

Figure 2:
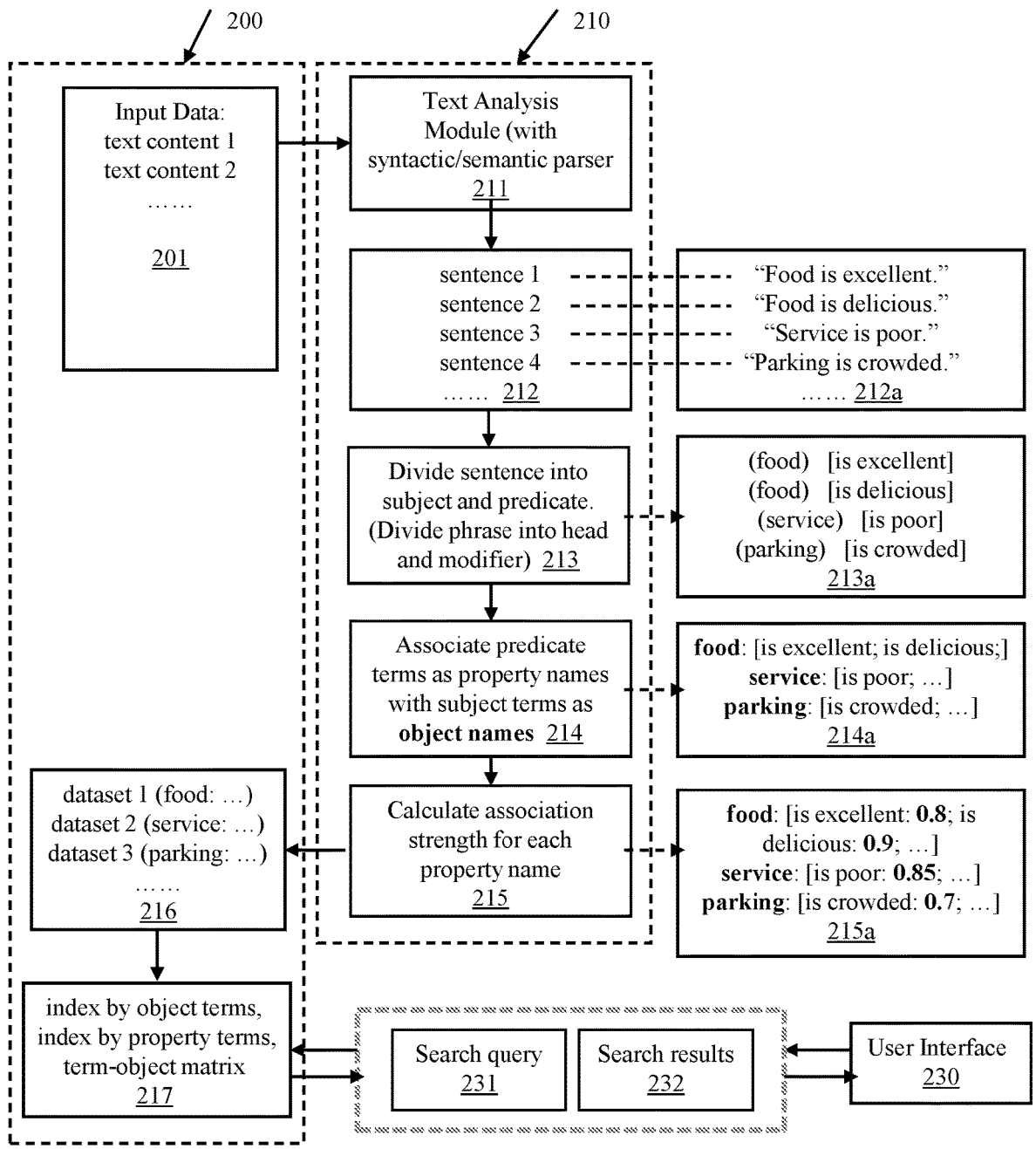
FIG. 2 is an exemplified system diagram for producing object-specific datasets from unstructured data using the methods of the present invention.

FIG. 2 is an exemplified system diagram and processing steps for producing object-specific datasets from unstructured data using the methods of the present invention.

In FIG. 2, the system includes a computer processing system 210, a computer storage system 200, and a user interface 230. The computer processing system 210 includes text analysis modules 211-215 for creating object datasets from the unstructured data sources 201. The computer processing system 210 can be implemented as, but not limited to, a central processing unit, an application-specific computer processor, a network server, and a group of computer processors. The computer processing system 210 can be implemented on a device that has computation power, for example, a personal computer, a portable computer, a mobile device such as a smart phone, a computer network system comprising servers and processors that can provide information service to a remote server or client machine, and a cloud computing system. The computer storage system 200 can store input data 201, which include various types of document data comprising one or more documents as text contents. The text contents can include any text in any language, such as a web page, a menu, a book, an email, a text message, an article, a dictionary, an instruction manual, a social media or blog comment, etc. The computer storage system 200 can be implemented in many types of storage media based on magnetic, optical, and mechanical properties, and nano materials, which can include a hard drive or an array of hard drives, flash memory, optical disks, and magnetic tapes. The user interface 230 can be provided, for example, by a program installed on a computer, a web browser, or an application for mobile devices.

The module 211 in the computer processing system 210 receives input data. The text analysis module includes algorithms that can function as a syntactic or a semantic parser. The input text contents are first broken into sentences 212. Then each sentence is divided into a subject term and a predicate term, where the predicate term can be the portion of the sentence that is not the subject. Optionally, phrases in the subject and the predicate can further be broken down into a head of the phrase and one or more modifiers, as described above in the referenced disclosures. Then, each predicate term is associated with its subject term, with the predicate term representing a property associated with the object represented by the subject term 214. Optionally, (not shown in the steps), a modifier can be associated with the head term of a phrase, with the head term representing an object, and the modifier term representing a property associated with the object. Then, association strength values can be calculated to represent the strength of association or the importance of a property to the object 215. 212*a*, 213*a*, 214*a*, and 215*a* show example results of the corresponding steps.

As described above, the association strength can be determined based on various attributes, including the frequency of the property term in the text contents, and the grammatical, semantic or other contextual attributes associated with the property term. More detailed descriptions can be found in the above-mentioned patent applications which are incorporated herein by reference.

Once the input text contents are processed, the datasets created from the above steps can be output for various uses, and can be stored in computer storage media 216.

Creating Structured Representations for Unstructured Data Using Association Datasets The datasets can be stored in the forms such as the ones illustrated in FIGS. 1, 3, 4, 5, 6, and 7, as representations of the original unstructured text contents in 217.

Figure 3:
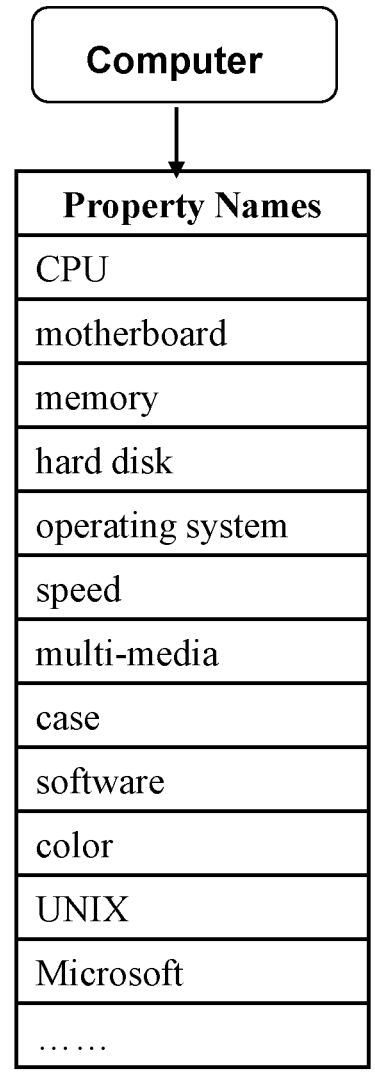
FIG. 3 shows an example of a one-column dataset adapted from FIG. 1.

FIG. 3 is an illustration for storing the property name under the object name without also storing the association strength.

Figure 4:
FIG. 4 is an example of object-properties association datasets created from a collection of social media reviews as unstructured data sources.

FIG. 4 is an example of two object-properties association datasets created by the system illustrated in FIG. 2 from a collection of social media reviews on a restaurant, with more data than the examples in FIG. 2. In FIG. 4, one exemplar dataset is based on the object name of "food" (400), and another is based on the object name of "service" (410), each with exemplar association strength values for its property terms.

Multiple conceptual association datasets can be organized in the form of a table or matrix, or in the form of an inverted index, or in the form of a hierarchical structure like a tree, thus creating a structured or semi-structured representation of the information extracted from the unstructured text data sources.

In some embodiments, each dataset can be treated as a term vector, such as in FIG. 1 and FIG. 2, and the plurality of the term vectors representing the plurality of the concepts or topics can be organized into a term-concept or term-topic matrix, with each individual dataset constituting a column or row of the table. In such a table, the values of the association strength will be zero for all terms that are not contained in a specific conceptual dataset. FIG. 5 illustrates the structure of such a term-concept or term-topic matrix.

In FIG. 5A, concept names are shown in 510, and terms are shown in 520. The values 530 are either 1 or 0, indicating whether a term is a property term of the concept or not. In FIG. 5B, the values can be exemplarily between 0 and 1, indicating whether the association strength of the term is a property term of the concept or not. In some embodiments, the values can be either greater or smaller than the examples in FIG. 5B.

In some other embodiments, each dataset can be treated as a term vector, and the plurality of the term vectors representing the plurality of the concepts or topics can be merged into an inverted index of terms each with pointers to the concept dataset names that contain the term, and optionally, also to their respective association strength or weight values. In some embodiments, if the association strength value is below a threshold, the entry can be removed from the pointers to reduce storage space or processing requirements. Such pointers are sometimes known as postings in the index.

Figure 6:
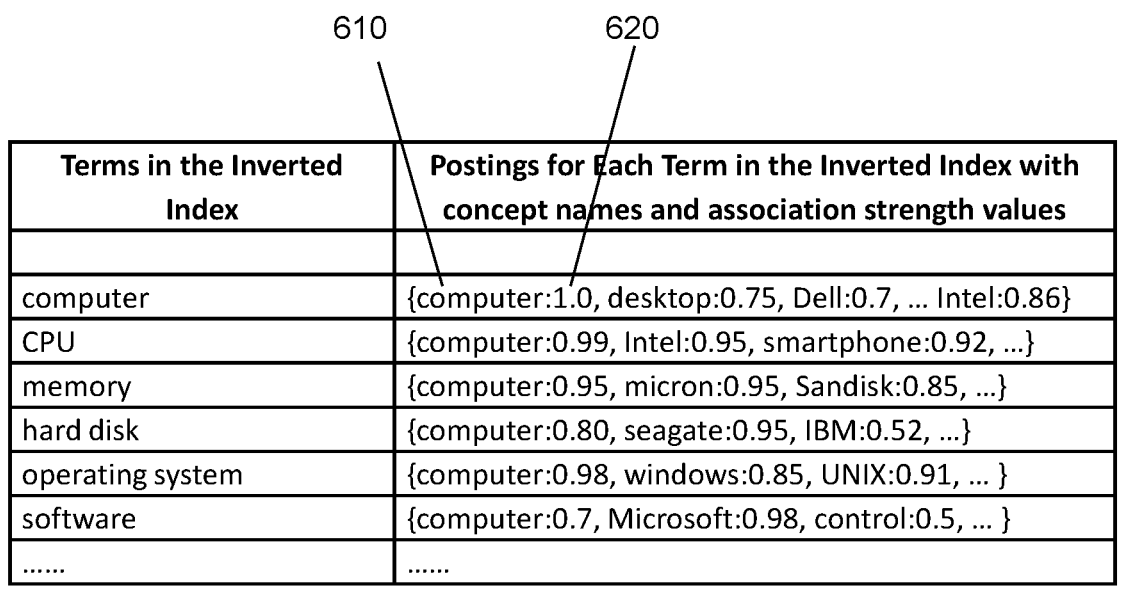
FIG. 6 illustrates the structure of a term-concept or term-topic inverted index.

FIG. 6 illustrates an exemplar structure of such a term-concept or term-topic inverted index, with concept names such as "computer", "desktop", "Dell", "Intel", etc. (610), and their corresponding hypothetical association strength values (620).

When the datasets are indexed by object term, when a search query (231) is for a known object, the property terms can be returned as answers to the query (232). The datasets can also be indexed by property terms such as when a search query is for an object with a known property, the object terms can be returned as answers to the query, as described above.

Furthermore, in some other embodiments, the multiple datasets can form a hierarchical structure representing different levels of association data.

Figure 7:
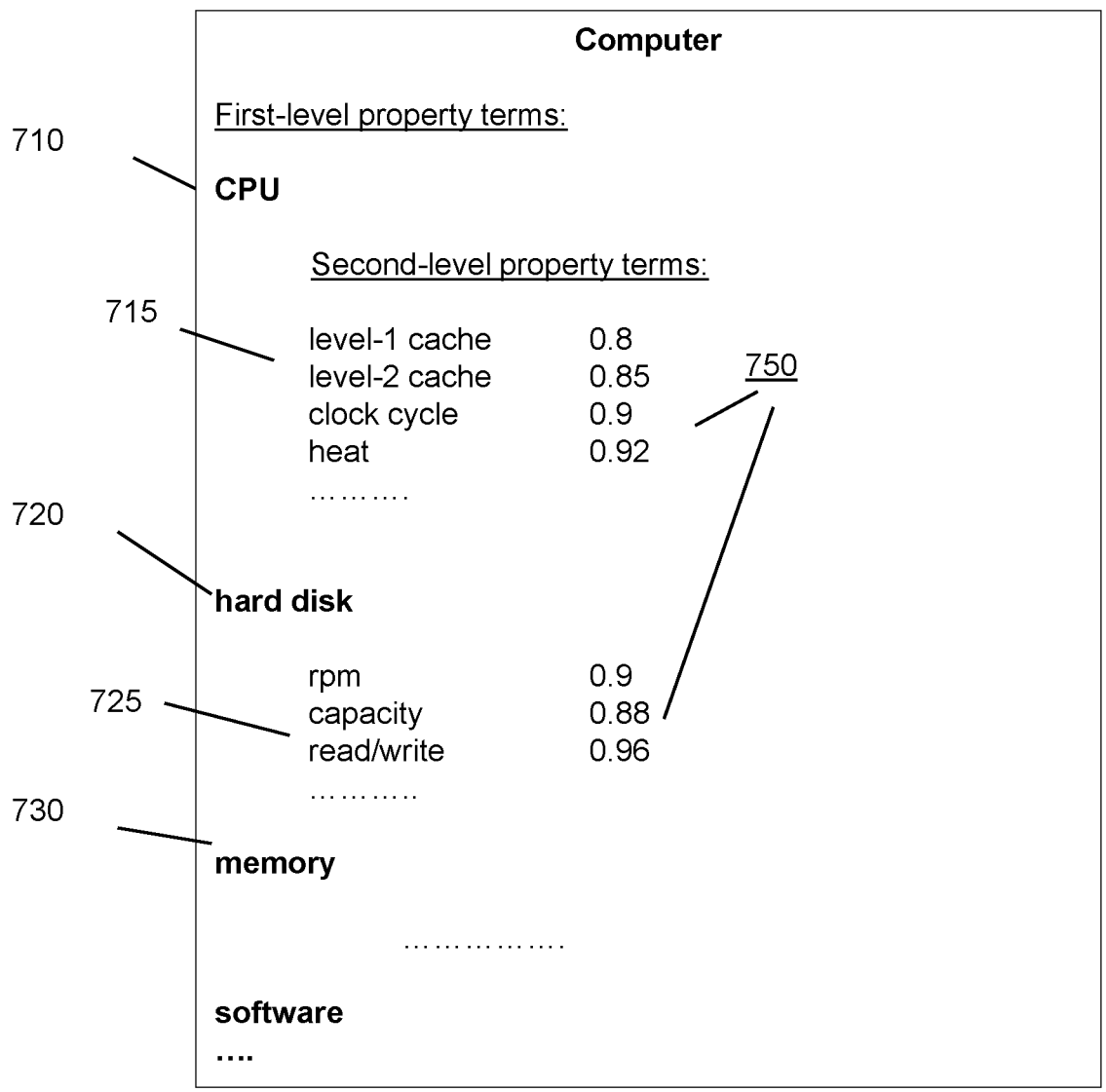
FIG. 7 illustrates an exemplar hierarchical structure of object or concept and properties association.

FIG. 7 is an exemplar illustration of the structure. In FIG. 7, one or more of the property terms (710, 720, 730) in a dataset can have a second-level association dataset (715, 725), comprising one or more property terms that are associated with the property term on the first level. Like in the first-level dataset illustrated in FIG. 1, FIG. 6A and FIG. 6B, each second-level property term can also have one or more columns of corresponding association strength values (750). The relevance determination methods described above can be recursively applied to each level for more accurate results when such datasets are available.

In yet some other embodiments, the property terms of a dataset can be stored separately, not necessarily in a list or column or row format, but stored as data points in any format linked with the concept or topic or object name or description.

These forms of the association datasets can be viewed and can function as a structured or semi-structured representation of the information extracted from the unstructured text data sources, and can make search and analysis of such information much easier than in their original unstructured formats, and can further be used as a data visualization tool to reveal topics, trends, and other insights that would otherwise not be able to obtain in their original unstructured formats. This is one of the advantages of the present invention over the conventional method of a term vector or a term-document matrix for representing the same text contents.

In general, any number of text content containing at least a grammatical sentence of a language can be represented in such a way. Text data are commonly known as "unstructured data". On the surface, the text data in a document are a flat string of characters. They are considered as unstructured when compared with the data in a database that are well-structured by predefined tables. However, it is also well known that text in any language has linguistic structures, such as the grammatical structure, as well as semantic structure. The present invention identifies the structural relationships between the words or phrases used in the text content from an information point of view, and represents an information structure of the text content by creating one or more object-properties association datasets based on any given text content, which can further enable more effective information retrieval and presentation.

As described above, the object-properties relationships can be captured by identifying the grammatical relationships between the grammatical subject and predicate in a sentence, as well as between the head and its modifiers in a complex phrase. All these attributes can be used to build one or more object-specific datasets based on a given text collection, as a structured or semi-structured representation of the unstructured text collection.

More Applications of the Above Methods

The system and methods of the present invention can be applied to a wide array of uses cases.

The example in FIG. 2 illustrates a use case of searching information from a large number of social media contents such as product or service reviews. Similar cases of this type of application can include enterprise internal documents of various types. One example is the technical or customer support documents.

A company may have accumulated a large number of technical support documents. In the conventional method of keyword-based search, a user enters a keyword and the system returns a list of search results containing the keyword. In such a case, the user will have to read the documents one by one to find whether one of the documents contains the needed information. In contrast, using the methods of the present invention, the unstructured document collection can be treated as a collection of training data, and the documents can be analyzed using the methods illustrated above to create one or more object-properties association datasets as a structured or semi-structured representation of the unstructured documents, which can then be used to answer user queries by providing answers to the questions rather than providing a list of documents that require the user to make further effort in finding information they are looking for in the documents.

Furthermore, the system and methods of the present invention can be applied to other information retrieval cases.

As described above, an object in the present invention can be any object, including a physical object, such as a person, a company, a product or service, a sound, a scene, etc., or a mental object such as an idea, a concept, a topic, or an interest, etc. The methods disclosed in the present invention can be applied to any of such objects.

Figure 8:
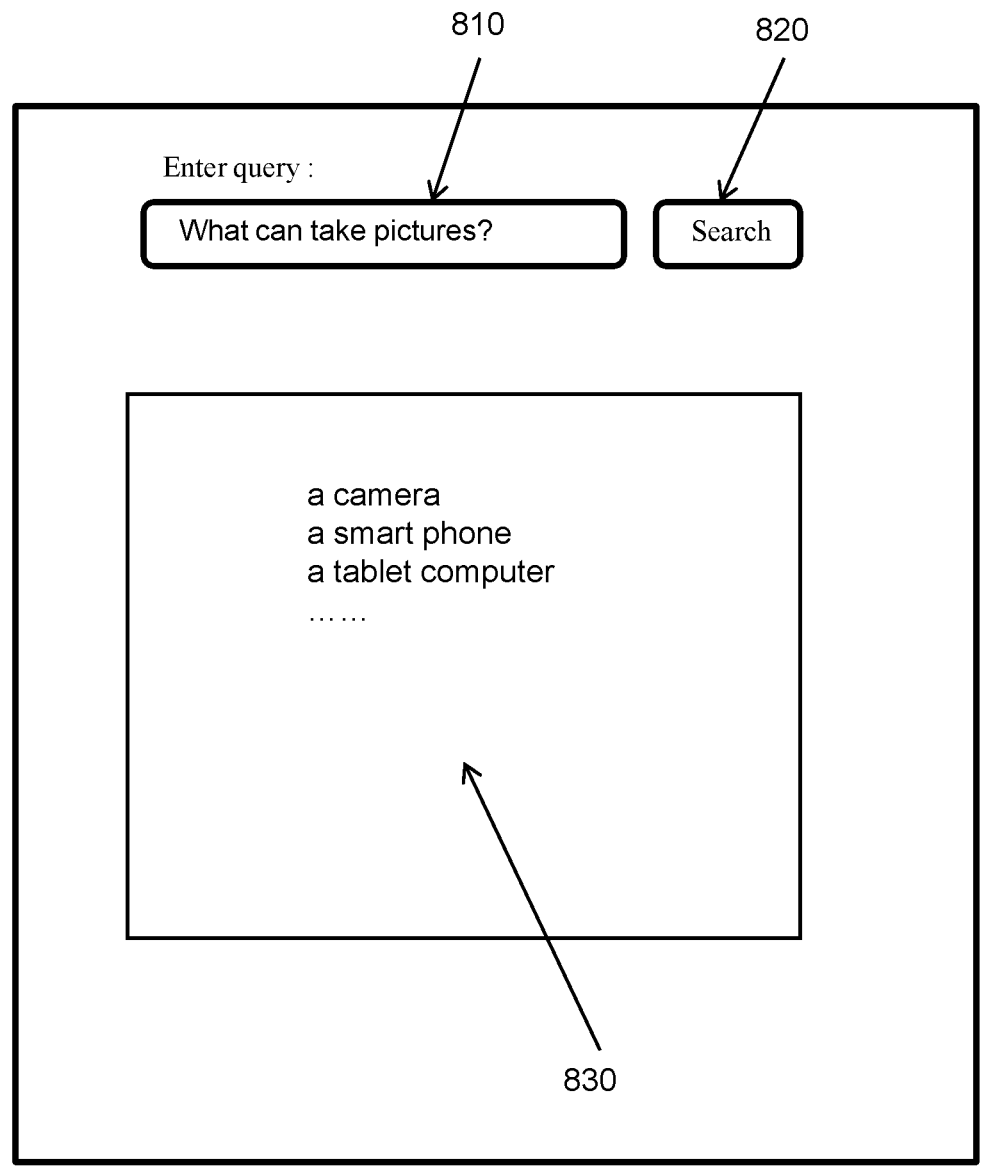
FIG. 8 is an exemplar user interface illustrating displaying names of device objects as an answer to a query about a known property.

In some embodiments, the object is a product or a service. In addition to searching for what a product or service is, a typical use case is to search an unknown product or service by a known or desired function or feature, without knowing what the product or service's name is. The above examples with the object of "camera" or "computer" are instances of such use cases. When object-properties association datasets can be created using the methods described above, especially from unstructured data as information sources, such as web pages, articles or blogs, books, social media comments, etc., a user can query the system by a question such as "What can take pictures?" or an incomplete question or sentence such as "take picture" or "can take picture", etc., and the system can return object names such as "camera", "smart phone", or "tablet computer", etc., as answers, as illustrated in FIG. 8.

Figure 9:
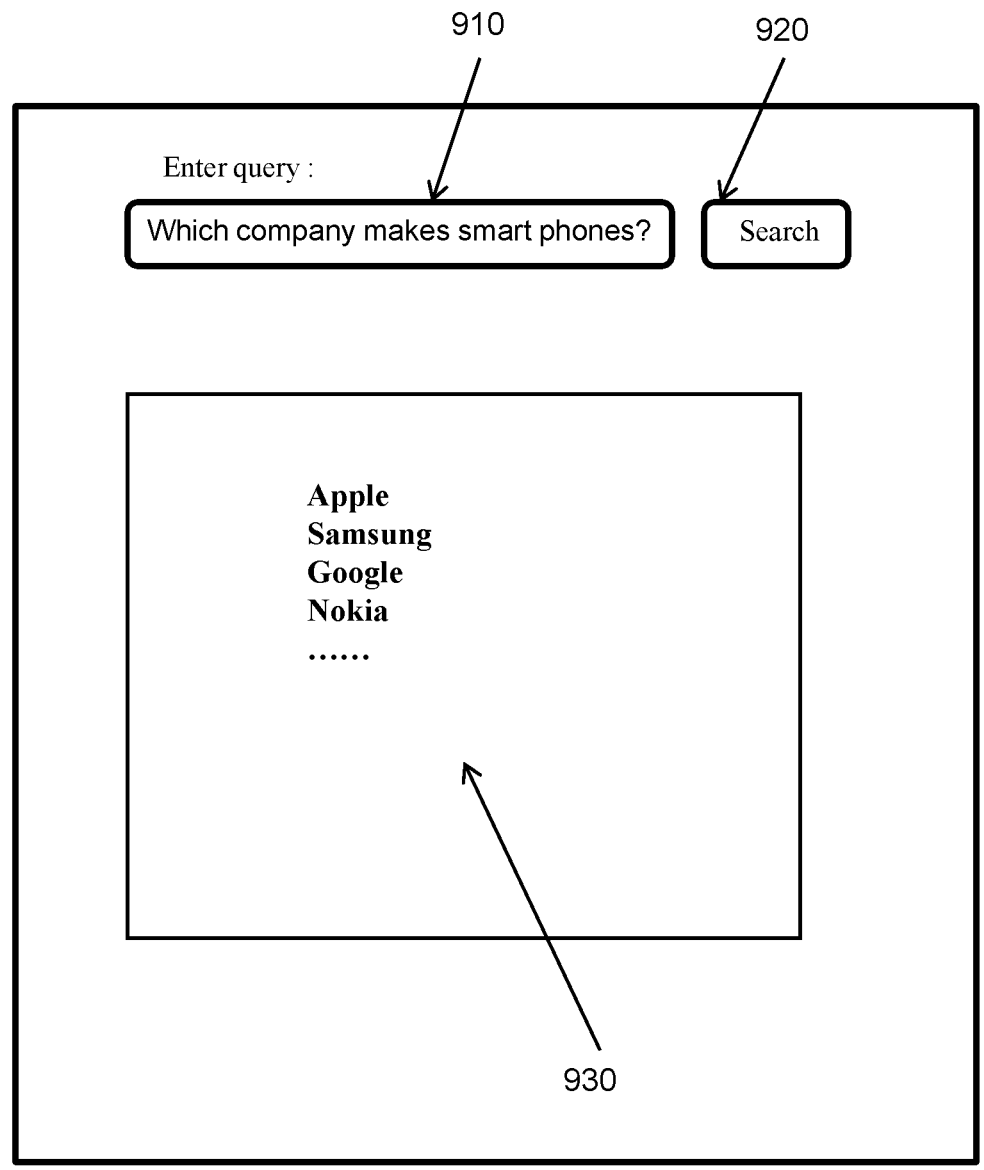
FIG. 9 is an exemplar user interface illustrating displaying names of company or organization objects as an answer to a query about a known property.

In some embodiments, the object is an organization such as a company or a group of companies. Once an object-properties association dataset can be created using the methods described above, a user can query the system by a question such as "Which company makes smart phones?" or "I am looking for a company that makes smart phones", and the system can return company names such as "Apple", "Samsung", or "Google", etc., as answers, as illustrated in FIG. 9.

In some embodiments, the object is a person or a group of persons. Once an object-properties association dataset can be created using the methods described above, a user can query the system by a question such as "Which senator talked about immigration reform?", and the system can return the names of those senators who talked about immigration reform.

In some embodiments, the object is a job position. Once an object-properties association dataset can be created using the methods described above, a user can query the system by a question such as "I am looking for a job that can use my accounting skills", and the system can return appropriate job or position names as answers instead of returning a list of job descriptions.

Other types of objects, such as a book, an image, etc., can also be the type of objects that can be queried using the methods of the present invention.

An advantage of the methods in the present invention is that unlike conventional search methods that usually require the user to specify the name of the thing to be searched for, in the present invention, a user does not need to know the name of the thing to be searched for. The user can search for that thing as long as he/she knows something that is associated to it.

It should be understood that the above-described methods are not limited to the specific examples used. Applications of the presently disclosed system and methods are not limited to the above examples, either. The system and methods can be applied to various types of computing devices or platforms, including fixed, portable, or mobile or cloud-based devices, media, and platforms. Configurations and processes can vary without deviating from the spirit of the invention.

Creating Structured Representations for Unstructured Data Based on Predefined Information Types In addition to the method of extracting and representing the information in an unstructured text without a pre-defined information type or attribute, and with examples mainly based on the technical documents created and provided by a company for its products or services, a different type of structured representation can be created based on a different type of text content, such as the contents created by users of the product or service.

Specific types of information can be identified and extracted from this type of unstructured data, and stored in a structured database, or displayed in a structured format.

The system and methods described below for creating structured representations for information extracted from unstructured data sources are mainly based on examples of text contents written by users of a product or service, such as comments, discussions, inquiries, etc., that can be in the form of emails, chats, or forum discussions, call-center transcription, and other types. Other types of examples include documents in specific domains or content types, such as job description documents in the recruiting domain or resume documents. It should be clear that the principles of the present system and methods can equally be applied to other types of text content and in other contexts or environments.

Users of a product or services often give feedback in the form of comments, emails, forum posts, phone calls or online chat, either to ask questions about the product's features/functions, or to report problems and look for solutions.

For large enterprises with multiple products or a large customer base, sorting through and analyzing the huge volume of such feedback data can be an overwhelming task to the support staff. Because such data is often unstructured in nature, performing an analysis on the topics and trends is usually a very challenging task.

In the present disclosure, advanced natural language processing methods are disclosed to turn such unstructured data into a structured or semi-structured format, such that the data can be effectively analyzed using conventional analysis tools such as spreadsheets, SQL queries, etc.

The examples in the present disclosure focus on identifying and extracting the two major types of content in general customer feedback data. One is the type of questions users ask, and other is the type of problems users report.

After identifying and extracting the text representing such information, each piece of the text can be tagged or labeled with the type of question or problem. The text can then be stored in a structured format, such as in a database table format with different data fields, in which the extracted text or the tags or labels can be the values stored in the data fields.

FIG. 10 is an example of a structured representation in the form of a data table for the information extracted from unstructured data sources, such as illustrated in FIG. 14B.

The system and methods for identifying and extracting such information, and then representing such information are described in details below.

First, a target type of information is defined, which includes a problem reported or a question asked as a request for information. Text units such as a word or phrase or sentence that describes a problem reported by a user or a question asked by a user can be treated as carrying or representing a target type of information. There can be various definitions of a target type of information, depending on the specific product or service. However, the principle of the methods can generally be applicable to different use cases. For text data written in any language such as the English language, words or phrases that describe or are related to describing a problem can first be collected, and compiled into a data set. For example, in the English language, words such as "problem", "issue", "error", "broken", "stuck", "failing", "crash", "not working", "wrong result", etc., can first be assembled into a data set, which can be called as a problem-terms data set, as a first step in identifying the text related to describing a problem.

Then, a text content is received. Words and phrases, sometimes known as tokens, are identified in the text content. In some embodiments of the present invention, tokens as text units can also include sentences or paragraphs.

Then, each token is matched with the terms in the problem-terms data set. If a match is found, in some embodiments, the token can be treated as a text unit that describes or is related to describing a problem. In some other embodiments, an estimate of the likelihood that the text unit represents a problem description is obtained and can be used for a later decision. In some other embodiments, more linguistic contextual analysis is performed to achieve a higher degree of confidence that the matched terms are describing or reporting a problem.

Once a problem is identified, the problem can further be categorized into one or more categories as sub-types or sub-classes. The categories can be pre-defined based on an initial inspection of the data, or based on one's domain knowledge. For example, some problems are related to error messages from a software product, some problems are related to a broken hardware device, some other problems are related to the product not producing expected results, etc. Each category or subclass can have a name in the form of a label or tag, which can further be attached to an extracted text unit, or to name a data field for storing an extracted text unit, or to be stored in a related data field representing the sub-class.

To identify which category or subclass a problem belongs to, in one embodiment, certain terms that carry a specific meaning related to the type of the problem can also be collected and assembled into a data set, which can be called a problem-category-terms data set.

For example, if a user reports seeing a message containing the text of "invalid input format", and the word "invalid" is in the category-terms data set for the category of "Error Message", then there is a high likelihood that the problem belongs to the category of "Error Message". If a user reports that the software screen unexpectedly disappeared without saving the user data, and the words "unexpectedly disappeared" or a similar phrase is in the category-terms data set for the category of "Failure or Crash", then there is a high likelihood that the problem belongs to the category of "Failure or Crash". If a user reports that he has spent a long time trying to make the product work, and the phrase "a long time trying to make the product work" or a similar phrase is in the category-terms data set for the category of "Difficult to Use", then there is a high likelihood that the problem belongs to the category of "Difficult to Use".

While determining the problem category by matching terms in the text against the terms in the data set can work in many cases, there can be cases where it will produce incorrect results. For example, if a user reports "the system failed but I did not see an error message." even though the words "error message" match terms in the category-terms data set for the category of "Error Message", the actual problem is not an error message.

To further increase the likelihood that the problems are correctly categorized, deeper linguistic analysis can be performed to identify the contextual relationships among the words and phrases in the text content. In this example, the words "did not see" is a negation phrase, which has the scope covering the phrase "an error message". When analyzed in such a manner, the problem will more likely be correctly categorized.

In this example, the words "did not see" is regarded as a piece of context in which the phrase "error message" occurs; and the two phrases have a specific grammatical relation of a verb and an object, and a specific semantic relation of a negation and its scope as a context. Such contextual or linguistic structural relationships can be used to achieve a higher degree of confidence when categorizing the problem.

In some embodiments, the text content as well as the terms in the data set that indicate a specific information type or category are semantically relevant in meaning to a specific product or service.

In some embodiments, the data set can also include linguistic patterns and variables. For example, based on instances such as "I can't figure out how to make it work", a pattern of "can't<verb> how to" can be included in the category-terms data set. When a phrase such as "can't figure out how to do it", or "can't find out how to do it" is recognized as matching the pattern of "can't<verb> how to" in the data set, it can be determined how likely the problem belongs to the category of "Difficult to Use".

When the input text content is analyzed using the above methods, and it is detected that a problem is being reported or described in the text content, the text that describes the problem, or a portion of the text that describes the problem can be extracted from the text content, and output to either a display device or a storage device. The extracted text can be attached with a tag or a label, such as "problem reported", indicating a type of target information.

In some embodiments, a data structure is created for displaying or storing the extracted text and its tag or label. For example, a column or a row in a table or database can be created. The tag or label can be used as the heading of the column to represent a data field, in this case, the field of "problem reported"; and the extracted text can be stored or displayed in the cell as a value in the data field, as illustrated in 1010 in FIG. 10.

In FIG. 10, if a company has multiple products, an exemplar database table can have its primary keys being the product names, and one of its columns labeled as "problems reported", and for a specific product, such as product A, the extracted text can be stored in the cell as illustrated in 1050.

In some other embodiments, when the problems are categorized as described above, the extracted text can also be displayed or stored with information about its categories, such as illustrated in 1020.

In some embodiments, the structured representation can be in a hierarchical format, such as the commonly know XML format or other markup language format, as well as a key:value pair format.

When displayed in a hierarchical format, the category information can serve as another layer of the structure in representing the information extracted from the unstructured sources.

FIG. 11 is an illustration of representing the category information of the extracted text in an XML format.

In addition to reporting a problem, another common type of information in the text data of user-generated content for a product or service is an inquiry or request for information, such as information regarding a specific aspect of the product or service, or inquiries about solving a problem a user encountered, or a specific procedure for operating a device, etc. Identifying this type of information is important to knowing what the customers of a product or service are looking for or need.

First, the part of the text indicating an inquiry or request for information is identified as another type of target information. In the present disclosure, different methods are provided for this purpose.

In some embodiments, one of the methods of identifying the part of the text indicating an inquiry or request for information focus on identifying the text that is or is part of a question, or a question equivalent.

In the English language, questions are typically marked by a question mark at the end of a sentence. However, not all questions are marked by a question mark, as users can often make a typological mistake to either put a different mark or omit a mark at the end of a question sentence. Furthermore, not all character string or word strings that are marked with a question mark are questions. Some computer codes, markup languages, messages, web addresses, etc., often contain question marks, and many of such question marks can be at the end of the text unit. In these cases, deeper linguistic analysis is needed to identify those questions that are not marked by a question mark, and those non-questions that are marked by a question mark.

At least in the English language, certain questions or inquires for information are expressed in a statement format, rather than in a question format marked by a question mark. For example, a user can say that "I want to know how to operate this machine." or "I wonder if somebody has also seen the same problem." etc. Both of these sentences are grammatically not a question as they are not marked by a question mark, but semantically and functionally, they are equivalent to questions.

In the present invention, terms, or words or phrases, that indicate a request for information are first identified and collected to form a data set, which can be called a question-terms data set.

In one embodiment, when identifying whether a text content contains text that indicates a desire for information, the tokens in the text content can be matched against the terms in the question-terms data set. For example, the canonical form of a grammatically well-formed question sentence has an auxiliary word or a question word (also called "wh-word") at the beginning of the question sentence, and a question mark at the end of the question sentence. For example, a question like "Does it work?" starts with the auxiliary verb of "does", and a question like "What is the name of this product?" starts with the question word of "what", and both end with a question mark. One way to identify a potential question sentence is to look for both the starting word and the ending question mark. If both are present, a question is identified with high certainty, or high likelihood, if only one is present, the sentence can still be identified as a question with a certain level of confidence or likelihood, depending on the other terms in the surrounding context. A sentence identified as a question with a high likelihood can be extracted to represent the target information.

In some embodiments, deeper linguistic analysis is performed on the sentence to increase the level of confidence or likelihood estimates. For example, a sentence such as "What I bought yesterday was a book." starts with the question word "what", but is not a question. In contrast, a sentence such as "Tell me what you think." is an equivalent to a explicit question of "What do you think?" even though it does not start with the question word "what", nor has a question mark at the end of the sentence. Linguistic analysis of the sentence structure and semantic content of the meaning of the word "tell" can help determine that the first example is not a question even though it starts with a question word, and the second sentence is a question even though it neither starts with a question word nor ends with a question mark.

Once a text unit indicating a request for information is identified, the content of the text can be checked to further identify the type of information that is being sought. This can include identifying the terms that constitute the subject, verb, object, and other parts of the sentence, as well as the terms that carry specific meanings. For example, if the question is "how do I perform task A with product X?" a portion of the text, such as "perform task A with product X", which includes the verb and the object noun and the prepositional phrase or adverbial, can be extracted and displayed or stored.

Similar to the examples of extracting text related to problem reporting or description as described above, a tag or a label can be defined and attached or associated to the extracted text in the current case, to indicate that the extracted text content represents the information or the type of information that is being sought by the user who produced the original text content.

In some embodiments, a data structure is created for displaying or storing the extracted text and its tag or label.

For example, a column or a row in a table or database can be created. The tag or label can be used as the heading of the column to represent a data field, in this case, it can be the field named "information sought", or "question asked", etc.; and the extracted text can be stored or displayed in the cell as a value in the data field.

As illustrated in FIG. 10, the text extracted from unstructured text sources is represented in a structured format. If a company has multiple products, an exemplar database table can have its primary keys being the product names, and one of its columns labeled as "information sought", or "question asked", and for a specific product, such as product A, the extracted text can be stored in the cell as illustrated in 1030. In this specific format, multiple rows can be created to store different problem for the same or different products.

Furthermore, the information or the type of information being sought can also be categorized into sub-types or sub-classes, and the category can further constitute layers in a more structured representation of the data extracted from unstructured text sources.

In some embodiments, the categories can be pre-defined based on an initial inspection of the data, or based on one's domain knowledge. For example, some types of information being sought can be about specific aspects of a product or service, such as whether a product can perform a specific task; and some other types of information being sought can be about whether the product includes a specific component; and some other types of information being sought can be about the procedure in installing, configuring, or operating the product. Some exemplar question categories can include "Operating Procedure", and "Feature Availability", "Product/Component Information", etc.

To identify which category an extracted text belongs to, in some embodiments, certain terms that carry a specific meaning related to the type of the information can be collected and assembled into a data set, which can be called a question-category-terms data set.

For example, if the text contains "I need to know how to generate a report", and the words "how to generate" are in the category-terms data set, and a matching process can produce a positive result, then there is a high likelihood that the question belongs to the category of "Operating Procedure". If the text contains "Does the product have a function that can automatically generate a report?", and the words "have a function" are in the category-terms data set, then there is a high likelihood that the question belongs to the category of "Feature Availability".

While determining the category by matching terms in the text against the terms in the data set can work in many cases, there can be cases where it will produce incorrect results. For example, if a user writes "I already know how to generate a report, but I want to see if it can also convert the data.", even though the words "how to generate a report" match terms in the category-terms data set for the category of "Operating Procedure", the actual information being sought is not about how to generate a report, but about the availability of another feature.

To further increase the likelihood that the questions are correctly identified and the information types are correctly categorized, deeper linguistic analysis can be performed to identify the contextual relationships among the words and phrases in the text content. In this example, the words "already know" have a syntactic and semantic scope covering the phrase "how to generate a report". When analyzed in such a manner, the information will more likely be correctly categorized.

In this example, the words "already know" are regarded as a piece of context in which the phrase "how to generate a report" occurs; and the two phrases have a specific grammatical relation of a verb and an object, and a specific semantic relation of possessing the information represented by the object phrase.

In some embodiments, the data set can also include linguistic patterns and variables. For example, based on instances such as "I need to know how to generate a report", a pattern of "how to <verb>" can be included in the category-terms data set. When a phrase such as "how to generate" is recognized as matching the pattern of "how to <verb>" in the data set, it can be determined how likely the expression belongs to the category of "Operating Procedure".

Similar to displaying the information in 1020 for problem categories, in some other embodiments, when the information types are categorized as described above, the extracted text can also be displayed or stored with meta-level information about its categories. The category information can serve as another layer of the structure in representing the information extracted from the unstructured sources.

FIG. 12 is an illustration of representing the category information of the extracted questions in an XML format.

In some embodiments, the extracted text as well as the tags or labels can be stored or displayed in a key-value pair format.

The above are examples of the system and methods of the present invention based on exemplar data of user-generated contents related to a product or service. The system and methods are generally applicable to other data types. For example, the target information types can include semantic categories of a specific event, a person or organization; or an attribute of an event, a person or organization, etc., in addition to the information types exemplified above that include a problem, the nature or type of a problem, an operating procedure, a product feature or function, a request for information, a question, etc.

In general, when implemented on a computing system comprising one or more processors and memory models and optionally coupled with storage, display or communication devices of various types, the methods of the present invention first defines a target information type, such as whether the unstructured data contains content related to a problem being reported, or related to a request for information of certain types, or other types of information that is of interest, or that is the target information being sought.

Then, a data set is received. The data set contains terms or symbols that are indicative of the presence of a specific type of information in a text content, and can be used to help identify other text units in the text content that carry the types of information. Such terms or symbols can serve as the context of the target information type.

A text content is also received for analysis. The text content is broken into words or phrase or sentences as tokens or text units; and the tokens are matched against the data set. If a match of a certain degree is found, a likelihood can be determined whether a portion of the text in the context of the matched terms or symbols represents the target information type. If the likelihood is high enough, then the portion of the text can be extracted for display or storage.

The likelihood can be determined based on a direct match between the terms or symbols in the text content and the terms or symbols in the data set, or based on a linguistic analysis of the syntactic and semantic relationships among the words and phrases in the text content, using the matched terms or symbols as a context to identify the relationships.

Once the type of target information is identified, and a portion of the text representing the information type is extracted, a tag or a label can be attached to the extracted text.

The tag or label can include the pre-defined terms or symbols in the data set, or a description of the target information type. The tag or label can be used as the name of a data field. The extracted text can be stored or displayed in the data field, together with the data field name, to form a structured representation of the relevant information in the originally unstructured data. The tag or label can be used as a value in another data field, as illustrated in FIGS. 10, 11 and 12.

Once the target information is represented in a structured format, various analyses can be performed to extract insights from the data. Such analyses can include trend analysis, visualization, etc.

Furthermore, in some embodiments, especially when the extracted text is a request for information, or a problem requiring a solution, keywords in the extracted text can be further identified and used as a search query to perform a search. Such a search can either be automatically performed when the user finishes entering the content, or be part of a suggestion to the user. In U.S. patent application Ser. No. 13/844,143 entitled "Systems, Methods, and User Interface for Effectively Presenting Information", and U.S. patent application Ser. No. 14/292,905 entitled "System, Methods, and User Interface for Automated Information Searching and Presentation", methods are provided for automatically searching and presenting related information based on a text content being created or viewed. The disclosures of which are incorporated herein by reference. In the present disclosure, when a user writes or reviews a text content regarding a product or service, specific types of information, such as the type of problems being reported or type of information being requested, are first detected using the methods described above, and then related information previously extracted into a database as a structured representation can be queried, and relevant information can be automatically displayed to the user for much enhanced productivity and user experience.

Figure 13:
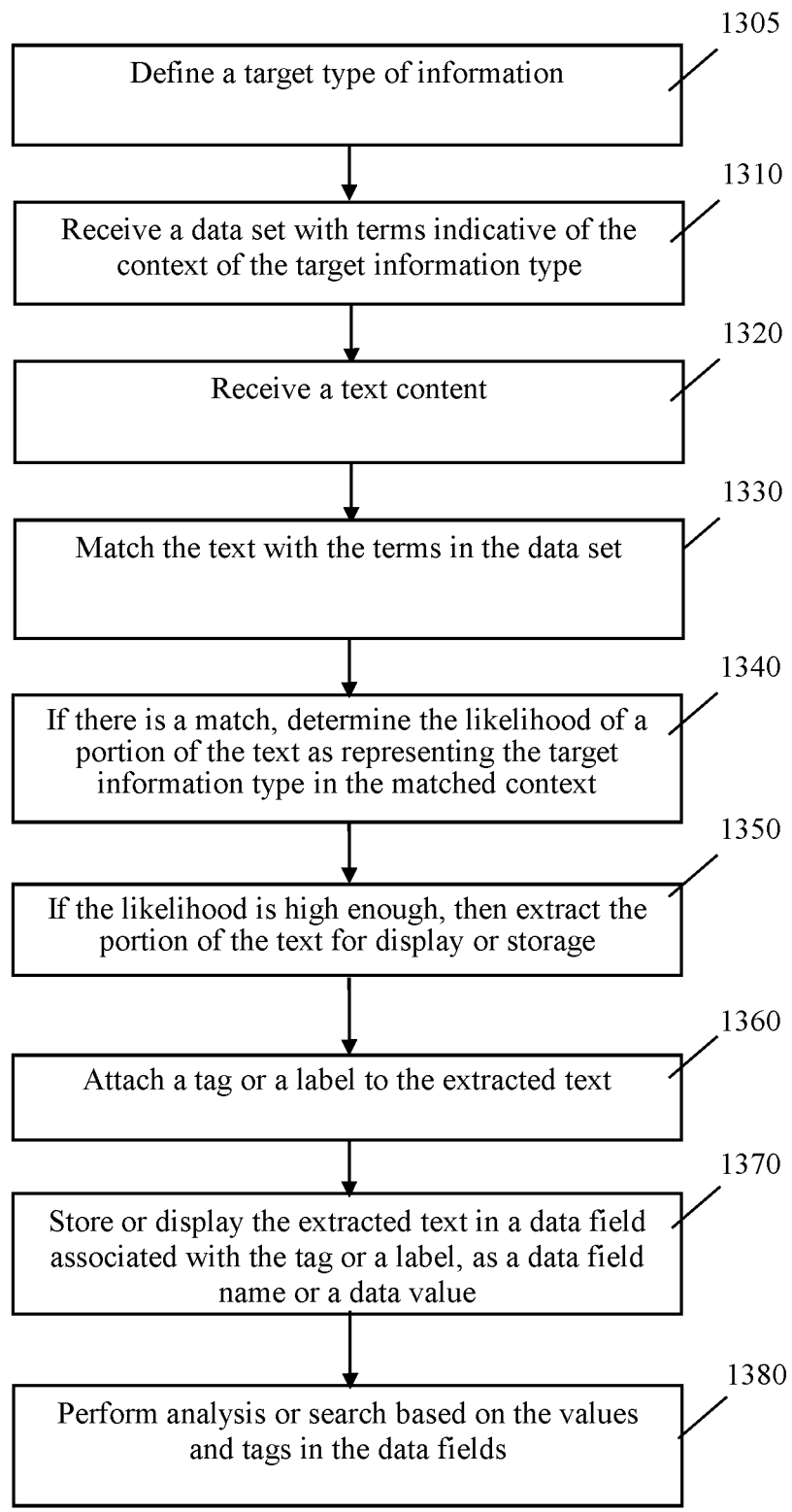
FIG. 13 is an illustration of the steps to create a structured representation of the information extracted from unstructured data sources.

FIG. 13 is an illustration of the steps to create a structured representation of the information extracted from unstructured data sources as described above. Using the methods, the unstructured data illustrated in FIG. 14B can be transformed into the structured formats illustrated in FIGS. 10, 11, and 12.

Using the methods described above, many of the contents in various types of unstructured data sources can be identified, extracted, and represented in a structured format. Once data is in the structured format, many types of analysis can be performed to extract further insights for informed decision-making and actions. For example, if a company receives a large amount of customer feedback data in the unstructured format, it is usually a very challenging task to analyze what problems are being reported the most often, and types of information are being sought by what customer segments, etc. However, using the method in the present disclosure, once the relevant information in the unstructured data are identified and represented in the structured format, commonly available methods and tools for performing analysis of structured data and for data visualization can be used to analyze and visualize the data as described above.

For example, a trend analysis can be performed to see which product has the most problems, and what types of problems are the mostly reported. And the results can be presented using appropriate visualization tools. Based on such analysis results, better business decision can be made to improve the product quality, and customer satisfaction.

Contextual Methods for Identifying Text with Pre-Defined Attributes

In the above description, a structured or semi-structured representation of data from an unstructured data source is created by identifying text units that are associated with a pre-defined attribute as an information type, and then extracting the text units and storing them in a structured format.

In addition to the above description with user feedback data as an exemplar data type, the contextual analysis methods can further be extended and applied to other types of text contents and information types. In the following description, examples are mainly from recruiting domain, such as a resume or job description document as a domain-specific data type, for ease of illustration.

In the present invention, for a given target term and a target attribute, various attributes of other terms in the context surrounding the target term are used to determining the likelihood of the target term being associated with the target attribute. The attributes of the other terms in the context can include lexical, syntactic, or semantic attributes and/or their relations with the target term.

In general, a text unit always has a certain type of attribute. A well-known example is that certain terms are product names, and certain other terms are company names, or person names, etc., which are a type of semantic attribute associated with a term, such as the attribute of being a named entity, etc. Conventional methods, such as named entity recognition methods, are mainly based on dictionary lookup or machine-learning with a large amount of human labeled training data, and each has its own limitations.

For example, when analyzing a job requirement document, names of skills need to be recognized or extracted. Without a sufficient amount of pre-labeled training data for machine-learning, some conventional methods may need to use an external source such as a dictionary or other precompiled list to match a word with an entry in the dictionary. However, the conventional methods may fail if the dictionary does not contain a complete list of skill names.

In contrast, in the present invention, contextual information and linguistic analysis are used for identifying attributes associated with the target term without matching the target terms with entries in a dictionary. For example, in a job requirement document for hiring a data engineer, a phrase such as "a strong ability in data warehousing" contains a skill name of "data warehousing". When the phrase is not in a dictionary, conventional methods may fail. However, in the present invention, the contextual phrase of "strong ability in" can be used as a clue to indicate that there is a high likelihood that the noun phrase "data warehousing" in the preposition phrase is a name of a skill. In this particular case, the syntactic and semantic attributes of the complex phrase "strong ability" which comprises a head noun and a modifier, and the preposition of "in", which further signifies a head-modifier relation between the target term and the terms in the context, can together provide a good amount of information for making an estimate of the likelihood that the noun phrase "data warehousing" is a skill name.

When the likelihood is high, the term "data warehousing" can be extracted and stored in a data field in a database. This provides an effective method for transforming information from an unstructured data source into a structured format.

For another example, a job description document or a resume document may include a phrase like "familiar with enterprise search", or "three years experience in OOP", etc., for the noun phrases such as "enterprise search" and "OOP", their contextual phrases such as "familiar with" and "three years experience in" can be used as evidence for estimating the likelihood that the noun phrases are skill names in the tech recruiting domain, based on the syntactic and semantic attributes of the contextual terms, as well as their head-modifier relations with the target noun phrases as signified by the attributes. If the likelihood value is high enough, these noun phrases can be identified as being associated with the attribute of being skill names as a special information type, and can be extracted and stored in pre-defined data fields in a structured format.

In these examples, the syntactic attributes of a contextual phrase such as being a modifier of a noun phrase in a preposition phrase, and semantic attribute such as its applicable meaning provide clues or evidence that another term in a syntactic or semantic relation with it or within its contextual scope can be a likely candidate of a skill name.

The methods can also be used for other types of data or documents in other domains.

The methods can also be interpreted in the light of the Object-Properties Association Model as described earlier and in the referenced disclosures.

In contrast to certain common machine-learning approaches that are based on keywords associations, the present invention are more based on the syntactic and semantic attributes as abstract knowledge.

In general, if a term with attribute A is known to be also associated with Attribute B, then, the presence of Attribute A can be used as evidence that there is a high likelihood that the term is also associated with Attribute B. Thus, for a pre-defined target attribute, such as the attribute of being a skill name, a target term can be defined as a term that is associated with the target attribute; and if it is known or can be determined that a skill name is usually also associated with another attribute such as being strong or weak, etc., then, if another term referring to or representing the other attribute is present in the context of the term, or has a syntactic or semantic relation with the term, it can provide evidence that the term is or is likely a target term.

Following this logic, for a given term such as the term "OOP", to determine whether the term is a target term (that is associated with the target attribute of being a skill name), or how likely the term may be a target term, the fact that a skill can have other attributes such as being strong or weak, etc., can be utilized. If certain terms in the context of the term refer to or represent such attributes, it can be used as evidence for making an estimate. For example, the contextual term "strong ability" refers to or represents the attribute of being strong, and the presence of this attribute can be used as evidence that there is high likelihood that the given term is also associated with the target attribute of being a skill name, thus the term can be identified as the target term with a high confidence, and later for extraction.

For another example, for given a term XYZ, if the target attribute is defined as an attribute of being a company name, and the term XYZ occurs in the context of "The CEO of XYZ resigned", then utilizing the fact that a company usually also has an attribute of having a CEO, the presence of the phrase "CEO" or "CEO of" in the context of the term XYZ, especially with its syntactic attribute of modifying the term XYZ, can be used as evidence that there is a high likelihood that the term XYZ is also a term associated with the target attribute of being a company name, and can thus be identified as the target term with a high confidence, and can be extracted.

In addition to the syntactic relation represented by the prepositions such as "of", "in" etc., contextual relations can also include other types of relations. For example, if the term XYZ occurs in a sentence such as "XYZ is a company located in San Francisco"; or "They founded XYZ last year." etc., the syntactic relations that signify a object-property relation as described earlier and in the referenced disclosures, such as subject-predicate relation, or verb-object relation, and head-modifier relation, etc., can all be used to identify a potential target term, or estimate a likelihood that a term is a target term.

In addition to the above examples with skill names, the pre-defined attribute or the target attribute can be any applicable attributes. For example, in the recruiting domain, the attribute can refer to a name of any type of object, such as the name of a person, a skill, a position, a company, a time period, an education degree, a publication, or other objects pertinent to the domain, as well as objects and attributes in domains other than the recruiting domain as examples.

Contextual Methods for Determining Term Weight

The methods for inferring an attribute associated with a given term using terms and attributes in the context of the given term as described above can further be extended to determine the term weight for the given term.

For example, for the purpose of identifying important terms in a document, or summarizing the key information in a document, or ranking a search result related to a term, the terms representing the most important topics or information can be identified and extracted for display. One way to determine which terms are more important than others in representing topics or information focuses is to assign term weights to different terms in the document based on various criteria, and select the terms that have the largest weight values.

The contextual methods described above can be an effective criterion for determining term weight. In the job description and resume example, if a resume or job description document needs to be summarized in a few words, which can further be used as tags or labels for the document, conventional methods may heavily rely on the frequency of the terms in the document as a criterion for selection. In contrast, in the present invention, the syntactic and semantic attributes of terms in the context of certain terms can be used as a criterion for determining term weight or selecting terms.

For example, in summarizing a resume or job description document, terms that represent skill names can be used as terms to represent topics or information focus in the document. Using the methods described above, when the object-property relation can be identified, or the contextual terms and their attributes can be identified, terms that are potential target terms can be assigned with larger weight values than other terms in the document, and optionally also using other criteria for determining the weight, those terms that have the largest weight values can be selected and extracted as topic terms or summary terms. In the above example, terms such as "data warehousing", "enterprise search", "OOP", etc., may be assigned larger term weights and be selected as topics or summary terms and be used as tags or labels for the document. Furthermore, in document search, if a query contains such terms, the search result can be ranked based on the term weight values for increased relevance.

In some embodiments, the contextual terms can be first assigned with a weighting co-efficient, and then using the weighting co-efficient to determine the weight value of the target term. The weighting co-efficient can be assigned based on the specific syntactic or semantic attribute associated with or represented by the contextual terms. For example, for a skill name such as "OOP", if the contextual terms are "strong ability in", it can be assigned a weighting-coefficient of 0.9 on a 0 to 1 scale, and if the contextual terms are "familiar with", it can be assigned a weighting-coefficient of 0.3 on a 0 to 1 scale, etc. The weight value of the target term can be based on the weighting co-efficient, as well as other criteria.

Mapping Semantic Attributes to Value Ranges

Certain types of semantic attributes, such as the meaning of a term in the context of another term, can be mapped to values or values ranges, and can be used for more intelligent tasks such as non-keyword-based search.

For example, in a search engine interface, such as a product search engine, if a user enters a search query such as "large TV", or "cheap computer", a conventional keyword-based search engine may not understand what the word "large" or "cheap" means, and may only return the results based on the keywords.

In the present invention, terms such as "TV" or "computer" are treated as terms representing names of objects, and the contextual terms such as "large" or "cheap" are treated as terms representing properties or attributes associated with the objects.

While the exact meaning of these terms as properties of object can be fuzzy in nature, or relative by users, certain types of properties are quantifiable or measurable, or more quantifiable than others, such as properties of being "large" or "cheap". Certain types of properties are enumerable, such as terms for color, like the term "red" can include a range of different sub-types of red color, or "bright color" can include another range of colors. While the value of a measurable or quantifiable attribute can be expressed by a number, the value of an enumerable attribute can also be expressed by a textual description, such as "red", "purple", or "pink" etc.

In some embodiments of the present invention, the meanings of terms representing such properties or attributes can be mapped to a range of values, thus when a user enters such fuzzy search queries, objects with property values within the range can be retrieved as search results.

One method for mapping the meaning of a term into a range of values is to first gather all the available values associated with an object in a data source, such as a specific product (like TV) in a product catalog or search index. Once the values are gathered, the values can be sorted in an order, and then the entire value range can be divided into certain sub-ranges. For example, if the screen sizes of all TV sets in the inventory or catalog are from 20" to 100", the range can be divided into, say three sub-ranges or more, by a computer system, depending on the specific needs. Terms representing quantifiable or measurable properties such as "large", "small", "medium" can each be mapped to a corresponding sub-range. For example, the term "small" can be mapped to the sub-range between 20" to 35", and the term "medium" can be mapped to the sub-range between 36" to 65", and the term "large" can be mapped to the sub-range between 66" to 100", etc. Once this is done, when a query contains an object name like "TV" and a term describing property or attribute of the product, like "large", the product in the catalog with a size specification between 20" to 35" can be retrieved as a search results. This way, the system becomes more intelligent, and the user can be better served.

This method can be applied to other types of properties represented by other types of terms. For example, if the query contains the property term of "cheap", and when the prices of the product being searched have been gathered and sorted and divided into sub-ranges by a computer system, further the term "cheap" can be mapped to the sub-range containing the lowest prices, and the term "medium-priced" can be mapped to the sub-range containing the medium prices, and so on so forth.

It is important to note that even though the meanings of such terms describing properties of certain objects are fuzzy in nature and relative in standards, once the entire range of values has been divided into sub-ranges, the sub-ranges are now relative to each other, and can be used as an effective way to resolve the relative standard problem commonly present with terms of this type.

Similarly, the method can be applied to terms of other types of quantifiable or measurable or enumerable properties or attributes, such as "light/heavy", "high/low", "long/short", "bright/dark", etc., like in "light-weight computer". Using the present method, when enough property terms are mapped to value ranges, a search engine will be able to answer queries such as "find computers that are not too heavy", and "find a cell phone that consumes less power", or "find a bight-colored car", etc.

Other types of syntactic or semantic or contextual analysis as described above can also be applied to more accurately determine the value range represented by a term in a query, such as the presence or absence of negation and negation scope. For example, if a query is "find computers that are not too heavy", the term "heavy" can first be mapped to a corresponding high-valued sub-range of the weight values associated with the product of computer in the search system. Meanwhile, a syntactic analysis of the context of the term "heavy" can determine that the term "heavy" is negated by the modifier phrase of "not too". Based on this, the complementary sub-ranges of the weight values, such as the light-weight sub-range, or the medium-weight sub-range, can be retrieved and returned as a search result.

Figure 15:
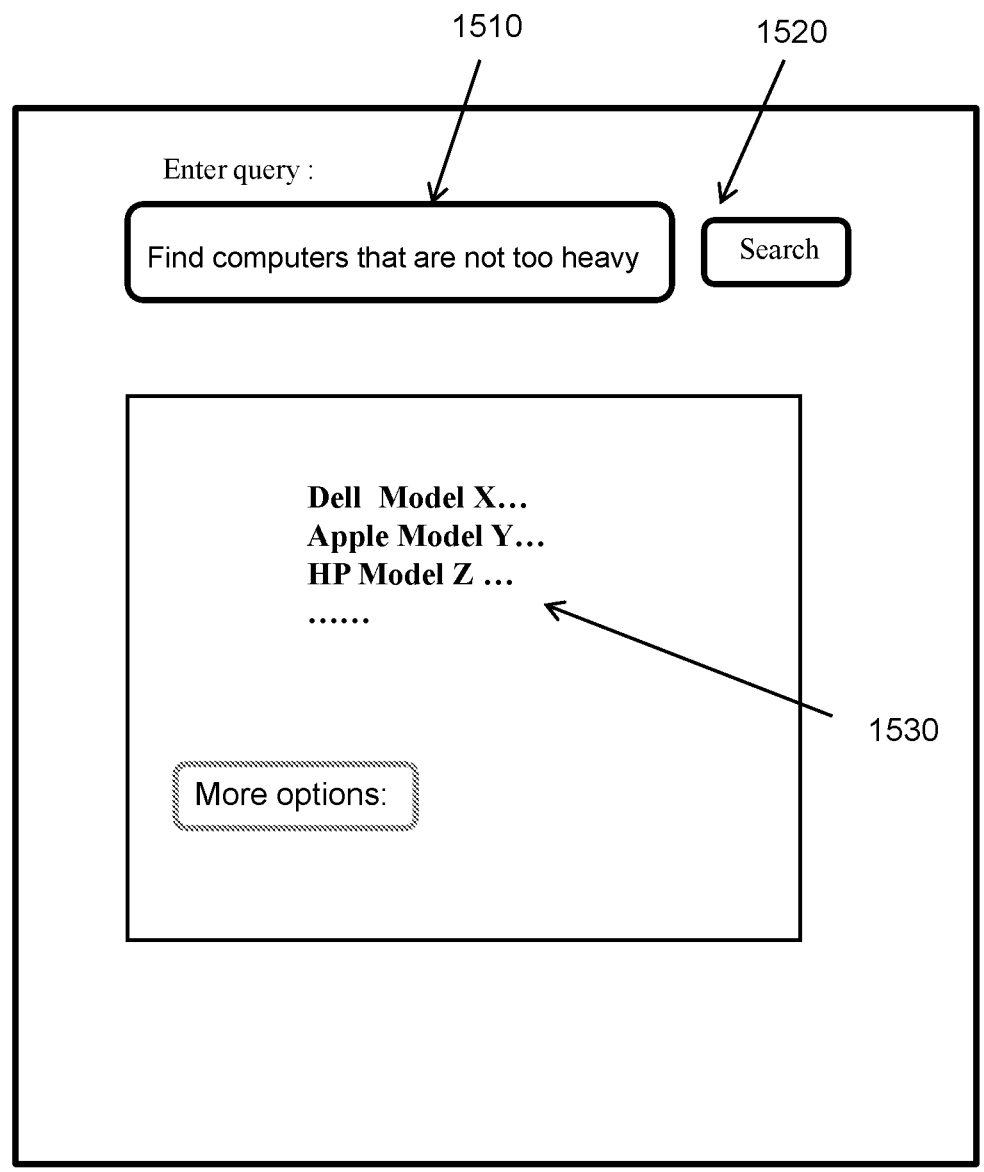
FIG. 15 is an example of an interface of a search engine that can understand a query like "find computers that are not too heavy" and return appropriate results.

FIG. 15 is an example of an interface of a search engine that can understand a query like "find computers that are not too heavy" and return appropriate results.

In general, using the present methods, applicable terms with a semantic attribute or meaning representing or describing a sub-range of values of a quantifiable or measurable or enumerable attribute can first be collected. On the other hand, for an object such as a product or anything that has a name, values of certain measurable or enumerable attributes, such as size, shape, weight, color, price, or other attributes of a similar nature, can be gathered and sorted in an order to form a global range. The global range can then be divided into sub-ranges of different values, based on the proximity of the values or other criteria; and terms with a meaning that represents a corresponding sub-range can be mapped to each of such sub-ranges. When the term is detected in a query, objects with queried attribute values within the corresponding sub-range can be retrieved and returned as a search result. Additional syntactic, semantic or contextual analysis can be performed to determine whether the sub-range represented by the term is modified by other terms in the context of the term. If the sub-range is modified, results corresponding to the modified sub-range can be returned.

Figure 16:
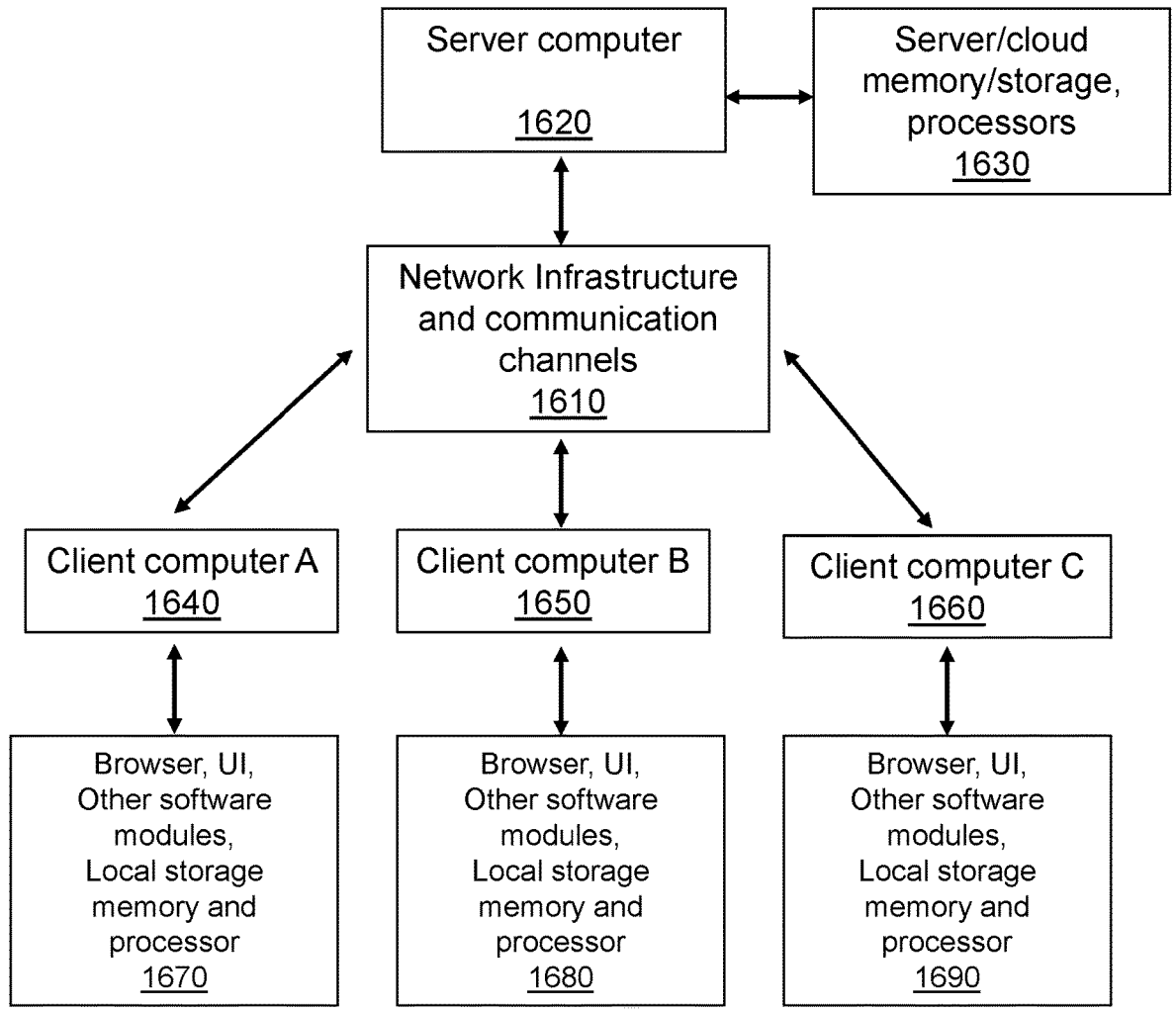
FIG. 16 illustrates the components of a computing system on which the present invention can be implemented.

FIG. 16 is a diagram illustrating a system in the form of a computer network comprising servers, client computers, and related components, where the electronic communications such as sending/receiving documents or search queries and search results are carried out and where the present invention can be implemented on one or more of the components.

In FIG. 16, one or more of the client computing devices (1640), (1650), and (1660), etc., are connected with each other and with one or more server (1620) computing devices through a network infrastructure and communication channels (1610). The server computing device (1620) is equipped with its own hardware processors and memory modules, and local or cloud-based storage media (1630) which can store various types of documents or search indexes or databases, as well as processing software modules. The client computing devices can have their own local storage, as well as memory modules and processors, coupled with various software modules including Web browsers, user interfaces, and text analysis software modules (1670), (1680), and (12690), etc. A user interface device includes devices such as a desktop, laptop, a mobile device with a screen, a television, or any other device with a display.

Documents or user actions or search queries and search results can be sent and received by the client computers and displayed in the user interface, or can also be processed on a client computer. Users of the client computing devices can launch software applications to perform searches and view results on the user interface.

The above examples are only for illustrative purposes. It should also be appreciated that the list of terms for various information types or categories are not exhaustive. The system and methods described in the present invention can be equally applied to various domain or industries, without deviating from the principle of the present invention. The methods can be applied to different types of data not specifically exemplified in the above descriptions. Furthermore, the word "term" includes any word or phrase or sentence, or characters or symbols that can be used in a language; and an "object" includes anything that has a name, including an object class or sub-class or its instances.

What is claimed is:

1. A computer-implemented method to enable a search engine to process fuzzy expressions in a query and to retrieve results that cannot be found through keyword-matching, comprising:
    receiving a query string for search information by a search engine;
    tokenizing the query string into tokens comprising words or phrases or sentences;
    identifying a first token and a second token;
    identifying a structural relation between tokens in the query, wherein the structural relation is not explicitly indicated in the query string, wherein the structural relation comprises a modifier-head relation inside a phrase structure;
    identifying a phrase, wherein the first token is a modifier and the second token is a head in the phrase;
    identifying whether the first token represents a name of a property associated with an object;
    identifying whether the second token represents a name of an object, wherein the object comprises a physical object, or a collection of physical objects, or a concept representing an object or class of objects;
    identifying a value associated with the property;
    identifying whether the value of the property is quantifiable;
    if the value of the property is quantifiable, then gathering the values of a collection of the objects and forming a corresponding collection of quantifiable values;
    determining a range in the quantifiable values;
    mapping the first token to a range of the quantifiable values;
    retrieving the objects or names of the objects that are associated with the property, wherein the values of the property are within the range; and
    presenting the retrieved objects or names of the retrieved objects as a search result relevant to the first token and the second token in the query.

2. The method of claim 1, wherein at least the first token is not the same keyword as the name of the property.

3. The method of claim 1, wherein the range of the quantifiable values is identified by:
    gathering a collection of objects;
    identifying a property or attribute associated with each of the objects in the collection;
    identifying whether a value of the property or attribute is quantifiable or not;
    if the value of the property or attribute is quantifiable, then sorting the objects in the collection of objects by the corresponding values; and
    determining the range of the values to be between a small value and a large value.

4. The method of claim 3, further comprising:
    dividing the range into one or more sub-ranges.

5. The method of claim 4, further comprising:
    mapping the first token to one of the sub-ranges.

6. The method of claim 5, further comprising:
    wherein the mapping of the first token to one of the sub-ranges is determined based on whether the first token semantically represents a range of values corresponding to the sub-range.

7. The method of claim 6, wherein the mapping of the first token to one of the sub-ranges is further determined based on a result of a computer-performed contextual analysis of the tokens in the query string.

8. The method of claim 7, wherein the computer-performed contextual analysis of the tokens in the query string includes identifying whether or not the first token is in a scope of a negation.

9. The method of claim 8, wherein the first token is in a scope of a negation, the method further comprising:
    identifying a sub-range that the first token is mapped to when the first token is not in a scope of negation as a first sub-range;
    identifying a complement of the sub-range in the range of values as a second sub-range; and
    retrieving the objects with values in the second sub-range.

10. The method of claim 9, further comprising:
    presenting the objects with values in the second sub-range as a search result relevant to the query string.

11. A computer-implemented method to enable a search engine to process fuzzy expressions in a query and to retrieve results that cannot be found be keyword-matching, comprising:
    receiving a query string for search information by a search engine;
    tokenizing the query string into tokens comprising words or phrases or sentences;
    identifying a first token and a second token;
    identifying a structural relation between tokens in the query, wherein the structural relation is not explicitly indicated in the query string, wherein the structural relation comprises a modifier-head relation inside a phrase structure;
    identifying a phrase, wherein the first token is a modifier and the second token is a head in the phrase;
    identifying whether the first token represents a name of a property associated with an object;
    identifying whether the second token represents a name of an object, wherein the object comprises a physical object, or a collection of physical objects, or a concept representing an object or class of objects;

identifying a value associated with the property;
identifying whether the value of the property is enumerable;
if the value of the property is enumerable, then gathering the values of a collection of the objects and forming a corresponding collection of enumerable values;
determining a range in the enumerable values;
mapping the first token to a range of the enumerable values;
retrieving the objects or names of the objects that are associated with the property, wherein the values of the property are within the range; and
presenting the retrieved objects or names of the retrieved objects as a search result relevant to the first token and the second token in the query.

12. The method of claim 11, wherein at least the first token is not the same keyword as the name of the property.

13. The method of claim 11, wherein the range of the enumerable values is identified by:
gathering a collection of objects;
identifying a property or attribute associated with each of the objects in the collection;
identifying whether a value of the property or attribute is enumerable or not;
if the value of the property or attribute is enumerable, then arranging the objects in the collection of objects by the corresponding values; and
determining the range of the values to be a set of the enumerable values.

14. The method of claim 13, further comprising:
dividing the range into one or more sub-ranges.

15. The method of claim 14, further comprising:
mapping the first token to one of the sub-ranges.

16. The method of claim 15, further comprising:
wherein the mapping of the first token to one of the sub-ranges is determined based on whether the first token semantically represents a range of values corresponding to the sub-range.

17. The method of claim 16, wherein the mapping of the first token to one of the sub-ranges is further determined based on a result of a computer-performed contextual analysis of the tokens in the query string.

18. The method of claim 17, wherein the computer-performed contextual analysis of the tokens in the query string includes identifying whether or not the first token is in a scope of a negation.

19. The method of claim 18, wherein the first token is in a scope of a negation, the method further comprising:
identifying a sub-range to which the first token is mapped when the first token is not in a scope of negation as a first sub-range;
identifying a complement of the sub-range in the range of values as a second sub-range; and
retrieving the objects with values in the second sub-range.

20. The method of claim 19, further comprising:
presenting the objects with values in the second sub-range as a search result relevant to the query string.

* * * * *